UNITED STATES PATENT OFFICE.

ANDREW DAVIDSON McKAY, OF LIVERPOOL, ENGLAND.

MEDICINAL FOOD.

SPECIFICATION forming part of Letters Patent No. 473,331, dated April 19, 1892.

Application filed October 17, 1891. Serial No. 409,055. (No specimens.)

*To all whom it may concern:*

Be it known that I, ANDREW DAVIDSON MC-KAY, a subject of the Queen of Great Britain, residing at Liverpool, in the county of Lancaster, England, have invented a new and useful Composition of Matter to be used as a Medicinal Food, of which the following is a specification.

The composition consists of the following ingredients, all of which should be pure and which I have combined in or about the proportions stated, although I do not restrict myself to these precise proportions, viz: dextrin, ninety-six parts; egg albumen, two parts; pepsin, 0.40 parts; hypophosphite of iron, 0.60 parts; hypophosphite of calcium, 0.50 parts; hypophosphite of sodium, 0.50 parts. The above ingredients, making up one hundred parts in all, are mechanically mixed by a suitable machine, by which the mixing is intimately effected, the order of their introduction being immaterial. No chemical change takes place in the mixing.

The principles upon which I have based my improved medicinal food are as follows, namely, first, that all foods in the service of man should be highly charged with nutrients and should be capable of solubility and assimilation; second, that to make a perfect food and what it should accomplish it should be noted that a food may be possessed of all the usual qualities, but it may only be capable of being used by ordinary healthy persons, whereas a perfect food will be capable of being assimilated and its nutrients applied to their proper uses equally by the feeble infant, the exhausted invalid, or the robust man; third, that a typically perfect food ought to embody all the elemental forces by which the human frame is built up—namely, carbohydrates, albuminoids, and phosphates.

My improved medicinal food fulfills all the above requirements, and its combined constituents make up a perfect food alike for infants, invalids, and generally for sufferers from indigestion. It is palatable, too, and nutritious.

The combination of dextrin and pepsin in my medicinal food not only supplies the system with the nutritient carbohydrates in the dextrin, but it becomes a very active agent in digesting rapidly the other carbohydrates and albuminoids contained in ordinary foods. The egg albumen serves the purpose of supplying in the interval between invalidity and convalescence the proper quantity of albumen without compelling feeble digestive organs to take their supplies from stronger foods. The hypophosphites in my composition promote healthy metabolism of bone, muscle, nervous tissues, and brain. They also contribute to the improved nutrition of the blood.

For the digestive ailments of infancy, which are the cause of the greatest proportion of infantile mortality, my improved food is a perfect remedy or preventive. A small quantity of it in milk given to babies not only rectifies the weak digestion at once, but immediately endows the child with a faculty of thriving, while it enables it to repel a great many infantile ailments which are usual accompaniments of enfeebled digestive powers.

For the digestive ailments of adults my medicinal food has similar effects as when given to children. The dose, however, should be larger—say double—and it may be used either in soups or in a little cold water at meal-times. The use of it in a very short time will abolish all the pains and inconveniences of indigestion and it will speedily restore that energy and buoyancy to which the victim of dyspepsia is invariably a stranger.

In cases of infantile cholera, rickets, and other diseases of children this medicinal food is invaluable. It is of great help, too, in gastric ulcer and incipient cancer of the stomach.

Having thus described my invention, what I claim as new, and desire to secure by Letters Patent, is—

The herein-described composition of matter to be used as medicinal food, consisting of dextrin, egg albumen, pepsin, hypophosphite of iron, hypophosphite of calcium, and hypophosphite of sodium, substantially as specified.

ANDREW DAVIDSON McKAY.

Witnesses:
CHARLES SLEE,
SAMUEL THOMAS McCORMICK.